(12) United States Patent
Kitamura et al.

(10) Patent No.: US 8,075,860 B2
(45) Date of Patent: Dec. 13, 2011

(54) THERMAL SPRAY POWDER AND METHOD FOR FORMING A THERMAL SPRAY COATING

(75) Inventors: Junya Kitamura, Kakamigahara (JP); Hiroyuki Ibe, Kakamigahara (JP); Yoshikazu Sugiyama, Ichinomiya (JP)

(73) Assignee: Fujimi Incorporated, Kiyosu-shi, Aichi (JP)

( * ) Notice: Subject to any disclaimer, the term of this patent is extended or adjusted under 35 U.S.C. 154(b) by 995 days.

(21) Appl. No.: 11/540,234

(22) Filed: Sep. 29, 2006

(65) Prior Publication Data

US 2007/0077363 A1  Apr. 5, 2007

(30) Foreign Application Priority Data

Sep. 30, 2005 (JP) ................... 2005-289172
Sep. 30, 2005 (JP) ................... 2005-289173

(51) Int. Cl.
*C23C 4/00* (2006.01)

(52) U.S. Cl. ........ 423/263; 427/446; 427/453; 428/357; 428/402; 428/688; 501/126; 501/152

(58) Field of Classification Search ............... 428/357, 428/402, 688; 423/263; 501/126, 152; 427/446, 427/453

See application file for complete search history.

(56) References Cited

U.S. PATENT DOCUMENTS

| | | | |
|---|---|---|---|
| 4,773,928 A | 9/1988 | Hauck et al. | 75/0.5 |
| 6,576,354 B2 | 6/2003 | Tsukatani et al. | 428/702 |
| 6,596,397 B2 | 7/2003 | Kaneyoshi et al. | 428/402 |
| 6,641,941 B2 | 11/2003 | Yamada et al. | |
| 6,685,991 B2 | 2/2004 | Wataya et al. | 427/446 |
| 6,733,843 B2 | 5/2004 | Tsukatani et al. | 427/453 |
| 6,767,636 B2 | 7/2004 | Takai et al. | 428/402 |
| 6,852,433 B2 | 2/2005 | Maeda | 428/697 |
| 6,916,534 B2 | 7/2005 | Wataya et al. | 428/402 |
| 7,138,192 B2 | 11/2006 | Yamada et al. | |
| 7,279,221 B2 * | 10/2007 | Kitamura et al. | 428/402 |
| 2001/0027159 A1 | 10/2001 | Kaneyoshi | 501/152 |
| 2002/0015853 A1 | 2/2002 | Wataya et al. | 428/469 |
| 2003/0203120 A1 | 10/2003 | Tsukatani et al. | 427/446 |
| 2006/0116274 A1 | 6/2006 | Kitamura et al. | 501/152 |

FOREIGN PATENT DOCUMENTS

| | | |
|---|---|---|
| EP | 0 254 324 A1 | 3/1985 |
| EP | 1 167 565 A2 | 6/2001 |
| EP | 1 239 055 A2 | 3/2002 |
| JP | 2002-080954 | 3/2002 |
| JP | 2003095649 | 4/2003 |
| JP | 2004-010981 | 1/2004 |
| JP | 2006118013 A | 5/2006 |
| JP | 2006-200005 | 8/2006 |

OTHER PUBLICATIONS

Translation of Japan 2006/118013, May 11, 2006.*

* cited by examiner

*Primary Examiner* — Steven Bos

(74) *Attorney, Agent, or Firm* — Vidas, Arrett & Steinkraus P.A.

(57) ABSTRACT

A thermal spray powder includes granulated and sintered yttria particles obtained by granulating and sintering a raw material powder in air or oxygen. The primary particles constituting the granulated and sintered yttria particles have an average particle size between 0.5 and 1.5 µm inclusive, and 1.11 times or more as large as the raw material powder. Alternatively, the primary particles have an average particle size between 3 and 8 µm inclusive.

8 Claims, No Drawings

THERMAL SPRAY POWDER AND METHOD FOR FORMING A THERMAL SPRAY COATING

BACKGROUND OF THE INVENTION

The present invention relates to a thermal spray powder comprising granulated and sintered yttria particles and a method for forming a thermal spray coating in which such thermal spray powder is used.

In the field of producing semiconductor devices or liquid crystal devices, micro-fabrication of the device is conducted by dry-etching using plasma. During this plasma process, some portions of the semiconductor device production equipment or liquid crystal display device production apparatus may be liable to etching damage by the plasma. However, techniques are known (e.g. Japanese Laid-Open Patent Publication No. 2002-80954) for improving the plasma etching resistance of such portions by providing a thermal spray coating thereon. By improving plasma etching resistance in this manner, scattering of particles can be suppressed, and as a result, the device yield improves.

Thermal spray coatings which are used for this purpose can be formed by plasma-spraying a thermal spray powder comprising, for example, granulated and sintered yttria particles. Development of such thermal spray powders have been attempted to enhance the plasma etching resistance of thermal spray coatings against different types of plasma, such as high-power plasma and low-power plasma. However, none of granulated and sintered yttria powders have satisfied yet performance requirements.

SUMMARY OF THE INVENTION

Accordingly, a first objective of the present invention is to provide a thermal spray powder and a method for forming a thermal spray coating, which are suitable for forming a thermal spray coating that has excellent plasma etching resistance against a plasma in which the plasma power being applied to the thermal spray coating per unit surface area is no less than 0.8 W/cm$^2$ (in the present specification hereinafter referred to as "high-power plasma"). A second objective of the present invention is to provide a thermal spray powder and a method for forming a thermal spray coating, which are suitable for forming a thermal spray coating that has excellent plasma etching resistance against a plasma in which the plasma power being applied to the thermal spray coating per unit surface area is less than 0.8 W/cm$^2$ (in the present specification hereinafter referred to as "low-power plasma").

To achieve the foregoing objectives and in accordance with a first aspect of the present invention, a thermal spray powder including granulated and sintered yttria particles obtained by granulating and sintering a raw material powder in air or oxygen is provided. The primary particles constituting the granulated and sintered yttria particles have an average particle size between 0.5 and 1.5 µm inclusive, and 1.11 times or more as large as the raw material powder.

In accordance with a second aspect of the present invention, a thermal spray powder including granulated and sintered yttria particles obtained by granulating and sintering a raw material powder in air or oxygen is provided. The primary particles constituting the granulated and sintered yttria particles have an average particle size between 3 and 8 µm inclusive.

In accordance with a third aspect of the present invention, a method for forming a thermal spray coating including forming a thermal spray coating by atmospheric-pressure plasma spraying of any one of the thermal spray powders is provided.

Other aspects and advantages of the invention will become apparent from the following description, illustrating by way of example the principles of the invention.

DETAILED DESCRIPTION OF THE PREFERRED EMBODIMENTS

A first embodiment of the present invention will now be described.

A thermal spray powder according to the first embodiment is essentially composed of granulated and sintered yttria particles. The granulated and sintered yttria particles, i.e. the thermal spray powder according to the first embodiment, are produced by a granulation and sintering process, or more specifically, are produced by producing a granulated powder from a raw material powder, then sintering and crushing this granulated powder into smaller particles, and if necessary, classifying.

The raw material powder may be a yttria powder, or may be a powder of a substance which is capable of ultimately being converted to yttria during the granulation and sintering steps, such as a yttrium powder, a yttrium hydroxide powder, and a mixture of a yttria powder with a yttrium powder or yttrium hydroxide powder.

Production of the granulated powder from the raw material powder may be carried out by spray-granulating slurry which consists of a raw material powder mixed in a suitable dispersion medium, or carried out by tumbling-granulating or compression-granulating to directly produce the granulated powder from the raw material powder.

To obtain a thermal spray coating that has excellent plasma etching resistance against high-power plasma, it is necessary for the type of ambient gas during sintering of the granulated powder to be air or oxygen. It is difficult to form a thermal spray coating that has excellent plasma etching resistance against high-power plasma from a thermal spray powder which was produced by sintering a granulated powder in an ambient gas other than air and oxygen, such as argon or nitrogen. The reason for this is that if sintering is conducted in an argon atmosphere or a nitrogen atmosphere, reduction of the yttria in the granulated powder occurs during the sintering, whereby as a consequence the oxygen content in the resultant thermal spray powder decreases. A thermal spray coating formed from a thermal spray powder having a low oxygen content is liable to containing lattice defects due to oxygen deficiency. Since etching of the thermal spray coating by the plasma preferentially proceeds from the defective portions in the thermal spray coating, a thermal spray coating formed from a thermal spray powder having a lower oxygen content tends to have a lower plasma etching resistance against high-power plasma.

If the maximum temperature (sintering temperature) of the atmosphere when sintering the granulated powder is less than 1,500° C., more specifically less than 1,550° C., and even more specifically less than 1,600° C., there is a risk that the plasma etching resistance of the thermal spray coating against high-power plasma may slightly deteriorate. The reason for this is that as the sintering temperature decreases, the more likely it becomes that the sintering will be insufficient. If the sintering is insufficient, there is little reduction in the defect density from sintering, whereby a thermal spray powder having a high defect density will be obtained. A thermal spray coating formed from a thermal spray powder having a high defect density is more likely to contain defects as a result of defects in the thermal spray powder. As described above, since etching of the thermal spray coating by the plasma preferentially proceeds from the defective portions in the thermal spray coating, a thermal spray coating formed from a thermal spray powder having a higher defect density tends to have a lower plasma etching resistance against high-power plasma. In addition, if sintering is insufficient, disintegration of the granulated and sintered yttria particles is more likely to occur during transportation from the powder feeder to the spray gun or while in the thermal spray flame. Therefore, to improve the plasma etching resistance of the thermal spray coating against high-power plasma and to suppress disintegration of the granulated and sintered yttria particles, the sintering temperature is preferably 1,500° C. or greater, more preferably 1,550° C. or greater, and most preferably 1,600° C. or greater.

On the other hand, if the sintering temperature exceeds 1,800° C., or more specifically exceeds 1,750° C., there is a risk that the plasma etching resistance of the thermal spray coating against high-power plasma may slightly deteriorate. The reason for this is that as the sintering temperature increases, it is easier for the sintering to become excessive. If the sintering is excessive, it is more difficult for the granulated and sintered yttria particles to be softened or melted by the thermal spray flame. As a consequence, unmelted or non-softened granulated and sintered yttria particles become mixed in the thermal spray coating, whereby the density of the thermal spray coating decreases and the plasma etching resistance of the thermal spray coating against high-power plasma deteriorates. In addition, if the softening or melting of the granulated and sintered yttria particles by the thermal spray flame becomes more difficult, deposit efficiency (spray yield) decreases correspondingly. Therefore, from the perspective of improving the plasma etching resistance of the thermal spray coating against high-power plasma and improving the deposit efficiency of the thermal spray powder, the sintering temperature is preferably no greater than 1,800° C., and more preferably no greater than 1,750° C.

If the maximum temperature holding time (sintering time) when sintering the granulated powder is less than 12 minutes, more specifically less than 30 minutes, and still more specifically less than 1 hour, grain growth of the primary particles is liable to be insufficient, whereby disintegration of the granulated and sintered yttria particles is more likely to occur. Therefore, to suppress disintegration of the granulated and sintered yttria particles, the sintering time is preferably 12 minutes or more, more preferably 30 minutes or more, and most preferably 1 hour or more.

On the other hand, if the sintering time is more than 30 hours, more specifically more than 20 hours, and still more specifically more than 10 hours, grain growth of the primary particles generally reaches saturation, and is thus not effective. Therefore, from the perspective of effective sintering, the sintering time is preferably no more than 30 hours, more preferably no more than 20 hours, and most preferably no more than 10 hours.

To obtain a thermal spray coating that has excellent plasma etching resistance against high-power plasma, it is necessary for the average particle size of the primary particles constituting the granulated and sintered yttria particles to be 0.5 µm or greater. If less than 0.5 µm, it is difficult to form a thermal spray coating that has excellent plasma etching resistance against high-power plasma from the thermal spray powder. The reason for this is that as the average particle size of the primary particles constituting the granulated and sintered yttria particles becomes smaller, the inter-lamellar region in the thermal spray coating which exhibits a lamellar structure relatively increases. The inter-lamellar region contains a large number of crystal defects, and since etching of the thermal spray coating by the plasma preferentially proceeds from defective portions in the thermal spray coating, a thermal spray coating having a higher relative volume of inter-lamellar region tends to have a lower plasma etching resistance against high-power plasma.

However, if the average particle size of the primary particles constituting the granulated and sintered yttria particles is less than 0.6 µm, even if 0.5 µm or greater, the relative volume of the inter-lamellar region in the thermal spray coating may be slightly higher, whereby as a consequence there is a risk that the plasma etching resistance of the thermal spray coating against high-power plasma may slightly deteriorate. Therefore, from the perspective of improving plasma etching resistance of the thermal spray coating against high-power plasma, the average particle size of the primary particles constituting the granulated and sintered yttria particles is preferably 0.6 µm or greater.

To obtain a thermal spray coating that has excellent plasma etching resistance against high-power plasma, it is necessary for the average particle size of the primary particles constituting the granulated and sintered yttria particles to be no greater than 1.5 µm. If more than 1.5 µm, it is difficult to form a thermal spray coating that has excellent plasma etching resistance against high-power plasma from the thermal spray powder. The reason for this is that as the average particle size of the primary particles constituting the granulated and sintered yttria particles becomes larger, the thickness of the inter-lamellar region in the thermal spray coating increases. As described above, the inter-lamellar region contains a large number of crystal defects, and since etching of the thermal spray coating by the plasma preferentially proceeds from defective portions in the thermal spray coating, a thermal spray coating which comprises an inter-lamellar region having a larger thickness tends to have a lower plasma etching resistance against high-power plasma.

However, if the average particle size of the primary particles constituting the granulated and sintered yttria particles exceeds 1.4 µm, even if no greater than 1.5 µm, the thickness of the inter-lamellar region in the thermal spray coating may be slightly larger, whereby as a consequence there is a risk that the plasma etching resistance of the thermal spray coating against high-power plasma may slightly deteriorate. Therefore, from the perspective of improving plasma etching resistance of the thermal spray coating against high-power plasma, the average particle size of the primary particles constituting the granulated and sintered yttria particles is preferably no greater than 1.4 µm.

To obtain a thermal spray coating that has excellent plasma etching resistance against high-power plasma, it is also necessary for the average particle size of the primary particles constituting the granulated and sintered yttria particles to be 1.11 times or greater than the average particle size of the raw material powder. If smaller than 1.11 times, it is difficult to form a thermal spray coating that has excellent plasma etching resistance against high-power plasma from the thermal spray powder. The reason for this is thought to be that the sintering is insufficient if the average particle size of the primary particles constituting the granulated and sintered yttria particles is smaller than 1.11 times the average particle size of the raw material powder. The reason why the plasma etching resistance of the thermal spray coating against high-power plasma deteriorates if sintering is insufficient is as explained above.

However, if the average particle size of the primary particles constituting the granulated and sintered yttria particles is smaller than 1.15 times the average particle size of the raw material powder, even if 1.11 times or greater, there is a risk that sintering may be slightly insufficient, whereby as a consequence there is a risk that the plasma etching resistance of the thermal spray coating against high-power plasma may slightly deteriorate. Therefore, from the perspective of improving plasma etching resistance of the thermal spray coating against high-power plasma, the average particle size of the primary particles constituting the granulated and sintered yttria particles is preferably 1.15 times or greater than the average particle size of the raw material powder.

If the average particle size of the granulated and sintered yttria particles is less than 20 μm, more specifically less than 22 μm, still more specifically less than 25 μm, and even more specifically less than 28 μm, there is a risk of a large quantity of comparatively fine particles being contained in the granulated and sintered yttria particles, whereby there is a risk that a thermal spray powder with good flowability cannot be obtained. Therefore, to improve the flowability of the thermal spray powder, the average particle size of the granulated and sintered yttria particles is preferably 20 μm or greater, more preferably 22 μm or greater, still more preferably 25 μm or greater, and even more preferably 28 μm or greater. It is noted that as flowability of the thermal spray powder deteriorates, the supply of thermal spray powder to the thermal spray flame tends to become more unstable, whereby the thermal spray coating thickness is more likely to be uneven and the plasma etching resistance of the thermal spray coating more likely to be uneven.

On the other hand, if the average particle size of the granulated and sintered yttria particles exceeds 60 μm, more specifically exceeds 57 μm, still more specifically exceeds 55 μm, and even more specifically exceeds 52 μm, there is a risk that it is more difficult for the granulated and sintered yttria particles to be sufficiently softened or melted by the thermal spray flame, whereby as a consequence there is a risk that the deposit efficiency of the thermal spray powder may deteriorate. Therefore, to improve the deposit efficiency, the average particle size of the granulated and sintered yttria particles is preferably no greater than 60 μm, more preferably no greater than 57 μm, still more preferably no greater than 55 μm and even more preferably no greater than 52 μm.

If the cumulative volume of the pores having a diameter of 3 μm or less in the granulated and sintered yttria particles exceeds $0.2\ cm^3/g$, more specifically exceeds $0.17\ cm^3/g$, and still more specifically exceeds $0.15\ cm^3/g$, there is a risk of the density of the granulated and sintered yttria particles decreasing, whereby as a consequence there is a risk that the density of the thermal spray coating formed from the thermal spray powder may also decrease. Therefore, to improve the density of the thermal spray coating, the cumulative volume of the pores having a diameter of 3 μm or less in the granulated and sintered yttria particles is preferably no greater than $0.2\ cm^3/g$, more preferably no greater than $0.17\ cm^3/g$, and still more preferably no greater than $0.15\ cm^3/g$. It is noted that a thermal spray coating with a low density has a high porosity, and that since etching of the thermal spray coating by the plasma preferentially proceeds from the pore vicinity in the thermal spray coating, a thermal spray coating having a high porosity tends to have a lower plasma etching resistance against high-power plasma.

If the peak of the pore size distribution in the granulated and sintered yttria particles is less than 0.06 μm, more specifically less than 0.07 μm, and still more specifically less than 0.08 μm, there is a risk that the plasma etching resistance of the thermal spray coating against high-power plasma may slightly deteriorate. Therefore, from the perspective of improving plasma etching resistance of the thermal spray coating against high-power plasma, the peak of the pore size distribution in the granulated and sintered yttria particles is preferably no less than 0.06 μm, more preferably no less than 0.07 μm, and most preferably no less than 0.08 μm. It is noted that as the peak of the pore size distribution in the granulated and sintered yttria particles decreases, there is a tendency for the ratio of the inter-lamellar region in the thermal spray coating to increase. As described above, the inter-lamellar region contains a large number of crystal defects, and since etching of the thermal spray coating by the plasma preferentially proceeds from defective portions in the thermal spray coating, a thermal spray coating having a higher relative volume of inter-lamellar region tends to have a lower plasma etching resistance against high-power plasma.

On the other hand, if the peak of the pore size distribution in the granulated and sintered yttria particles exceeds 2 μm, more specifically exceeds 1.9 μm, and still more specifically exceeds 1.8 μm, there is a risk that the plasma etching resistance of the thermal spray coating against high-power plasma may slightly deteriorate. Therefore, from the perspective of improving the plasma etching resistance of the thermal spray coating against high-power plasma, the peak of the pore size distribution in the granulated and sintered yttria particles is preferably no greater than 2 μm, more preferably no greater than 1.9 μm, and most preferably no greater than 1.8 μm. It is noted that as the peak of the pore size distribution in the granulated and sintered yttria particles increases, there is a tendency for the thickness of the inter-lamellar region in the thermal spray coating to increase. As described above, the inter-lamellar region contains a large number of crystal defects, and since etching of the thermal spray coating by the plasma preferentially proceeds from defective portions in the thermal spray coating, a thermal spray coating which comprises an inter-lamellar region having a larger thickness tends to have a lower plasma etching resistance against high-power plasma.

If the apparent density of the granulated and sintered yttria particles is less than 1.2, there is a risk of the density of the granulated and sintered yttria particles decreasing, whereby as a consequence there is a risk that the density of the thermal spray coating formed from the thermal spray powder may also decrease. Therefore, to improve the density of the thermal spray coating, the apparent density of the granulated and sintered yttria particles is preferably 1.2 or greater. As described above, it is noted that a thermal spray coating with a low density has a high porosity, and that since etching of the thermal spray coating by the plasma preferentially proceeds from the pore vicinity in the thermal spray coating, a thermal spray coating having a high porosity tends to have a lower plasma etching resistance against high-power plasma.

On the other hand, while the upper limit for the apparent density of the granulated and sintered yttria particles is not especially limited, it is preferable for the apparent density of the granulated and sintered yttria particles to be no greater than 3.0.

If the angle of repose of the granulated and sintered yttria particles exceeds 48 degrees, more specifically exceeds 44 degrees, and even more specifically exceeds 40 degrees, there is a risk that a thermal spray coating with good flowability cannot be obtained. Therefore, from the perspective of improving the flowability of the thermal spray powder, the angle of repose of the granulated and sintered yttria particles is preferably 48 degrees or less, more preferably 44 degrees or less, and most preferably 40 degrees or less. As described above, as flowability of the thermal spray powder decreases, the supply of thermal spray powder to the thermal spray flame tends to become more unstable, whereby as a consequence the thermal spray coating thickness is more likely to be uneven and the plasma etching resistance of the thermal spray coating more likely to be uneven.

The thermal spray powder according to the first embodiment is used in applications for forming a thermal spray coating by plasma spraying or some other thermal spraying process. The ambient pressure during plasma spraying of the thermal spray powder is preferably atmospheric pressure. In other words, the thermal spray powder is preferably used in atmospheric-pressure plasma spraying applications. If the ambient pressure during plasma spraying is not atmospheric pressure, and especially in the case of a low pressure atmosphere (reduced pressure atmosphere), there is a risk that the plasma etching resistance against high-power plasma of the resultant thermal spray coating may slightly deteriorate. If the thermal spray powder is plasma sprayed under a low pressure, there is a risk that reduction of the yttria in the thermal spray powder will occur during the thermal spraying, whereby as a consequence lattice defects due to oxygen deficiency are more likely to be contained in the thermal spray coating. As described above, since etching of the thermal spray coating by plasma preferentially proceeds from the defective portions in the thermal spray coating, there is a tendency for a thermal spray coating formed by low pressure plasma spraying to have worse plasma etching resistance against high-power plasma than that for a thermal spray coating formed by atmospheric-pressure plasma spraying.

Concerning a thermal spray coating formed from the thermal spray powder according to the first embodiment, if the porosity of the thermal spray coating is less than 1%, more specifically less than 2%, and even more specifically less than 3%, the thermal spray coating is too dense, whereby there is the risk that the thermal spray coating becomes more susceptible to peeling from residual stress in the thermal spray coating. Therefore, the porosity of the thermal spray coating is preferably 1% or greater, more preferably 2% or greater, and most preferably 3% or greater.

On the other hand, if the porosity of the thermal spray coating exceeds 15%, more specifically exceeds 12%, and even more specifically exceeds 10%, there is a risk that the plasma etching resistance of the thermal spray coating against high-power plasma may slightly deteriorate. The reason for this is that, as described above, etching of the thermal spray coating by the plasma preferentially proceeds from the pore vicinity in the thermal spray coating. Further, if porosity of the thermal spray coating is within the above-described range, there is a risk that through-holes will be contained in the thermal spray coating. This in turn gives rise to the risk that etching damage of the substrate due to the plasma cannot be sufficiently prevented. Therefore, from the perspectives of improving the plasma etching resistance of the thermal spray coating against high-power plasma and of preventing through-holes, the porosity of the thermal spray coating is preferably no greater than 15%, more preferably no greater than 12%, and still more preferably no greater than 10%.

The following advantages can be obtained from the first embodiment.

With the thermal spray powder according to the first embodiment, sintering of a granulated powder produced from a raw material powder is conducted in air or oxygen, and the average particle size of the primary particles constituting the granulated and sintered yttria particles is set at between 0.5 and 1.5 μm inclusive and at 1.11 times or greater than the average particle size of the raw material powder. For this reason, a thermal spray coating formed from the thermal spray powder according to the first embodiment has excellent plasma etching resistance against high-power plasma. In other words, the thermal spray powder according to the first embodiment is suitable for the formation of a thermal spray coating which has excellent plasma etching resistance against high-power plasma.

A second embodiment of the present invention will now be described.

A thermal spray powder according to the second embodiment is essentially composed of granulated and sintered yttria particles. The granulated and sintered yttria particles, i.e. the thermal spray powder according to the second embodiment, are produced by a granulation and sintering process, or more specifically, are produced by producing a granulated powder from a raw material powder, then sintering and crushing this granulated powder into smaller particles, and if necessary, classifying.

The raw material powder may be a yttria powder, or may be a powder of a substance which is capable of ultimately being converted to yttria during the granulation and sintering steps, such as a yttrium powder, a yttrium hydroxide powder, and a mixture of a yttria powder with a yttrium powder or yttrium hydroxide powder.

If the average particle size of the raw material powder is less than 2 μm, and more specifically less than 3 μm, there is a risk that the plasma etching resistance of the thermal spray coating against low-power plasma may slightly deteriorate. Therefore, from the perspective of improving plasma etching resistance of the thermal spray coating against low-power plasma, the average particle size of the raw material powder is preferably no less than 2 μm, and more preferably no less than 3 μm. It is noted that as the average particle size of the raw material powder becomes smaller, the inter-lamellar region in the thermal spray coating which exhibits a lamellar structure tends to increase respectively. The inter-lamellar region contains a large number of crystal defects, and since etching of the thermal spray coating by the plasma preferentially proceeds from the defective portions in the thermal spray coating, a thermal spray coating having a higher relative volume of inter-lamellar region tends to have a lower plasma etching resistance against low-power plasma.

On the other hand, if the average particle size of the raw material powder exceeds 8 μm, and more specifically exceeds 7 μm, there is a risk that the plasma etching resistance of the thermal spray coating against low-power plasma may slightly deteriorate. Therefore, from the perspective of improving plasma etching resistance of the thermal spray coating against low-power plasma, the average particle size of the raw material powder is preferably no greater than 8 μm, and more preferably no greater than 7 μm. It is noted that as the average particle size of the raw material powder becomes larger, the thickness of the inter-lamellar region in the thermal spray coating tends to increase. As described above, the inter-lamellar region contains a large number of crystal defects, and since etching of the thermal spray coating by the plasma preferentially proceeds from defective portions in the thermal spray coating, a thermal spray coating having a large inter-lamellar region thickness tends to have a lower plasma etching resistance against low-power plasma.

Production of the granulated powder from the raw material powder may be carried out by spray-granulating a slurry which consists of a raw material powder mixed in a suitable dispersion medium, or carried out by tumbling-granulating or compression-granulating to directly produce the granulated powder from the raw material powder.

To obtain a thermal spray coating that has excellent plasma etching resistance against low-power plasma, it is necessary for the type of ambient gas during sintering of the granulated powder to be air or oxygen. It is difficult to form a thermal spray coating that has excellent plasma etching resistance against low-power plasma from a thermal spray powder which was produced by sintering a granulated powder in an ambient gas other than air and oxygen, such as argon or nitrogen. The reason for this is that if sintering is conducted in an argon atmosphere or a nitrogen atmosphere, reduction of the yttria in the granulated powder occurs during the sintering, whereby as a consequence the oxygen content in the resultant thermal spray powder decreases. A thermal spray coating formed from a thermal spray powder having a low oxygen content is liable to containing lattice defects due to oxygen deficiency. As described above, since etching of the thermal spray coating by the plasma preferentially proceeds from defective portions in the thermal spray coating, a thermal spray coating formed from a thermal spray powder having a low oxygen content tends to have a lower plasma etching resistance against low-power plasma.

If the maximum temperature (sintering temperature) of the atmosphere when sintering the granulated powder is less than 1,600° C., more specifically less than 1,620° C., and even more specifically less than 1,650° C., there is a risk that the plasma etching resistance of the thermal spray coating against low-power plasma may slightly deteriorate. The reason for this is that as the sintering temperature decreases, the more likely it becomes that the sintering will be insufficient. If the sintering is insufficient, there is little reduction in the defect density from sintering, whereby a thermal spray powder having a high defect density will be obtained. A thermal spray coating formed from a thermal spray powder having a high defect density is more likely to contain defects as a result of defects in the thermal spray powder. As described above, since etching of the thermal spray coating by the plasma preferentially proceeds from the defective portions in the thermal spray coating, a thermal spray coating formed from a thermal spray powder having a high defect density tends to have a lower plasma etching resistance against low-power plasma. In addition, if sintering is insufficient, disintegration of the granulated and sintered yttria particles is more likely to occur during transportation from the powder feeder to the spray gun or while in the thermal spray flame. Therefore, to improve the plasma etching resistance of the thermal spray coating against low-power plasma and to suppress disintegration of the granulated and sintered yttria particles, the sintering temperature is preferably no less than 1,600° C., more preferably no less than 1,620° C., and most preferably no less than 1,650° C.

On the other hand, if the sintering temperature exceeds 1,800° C., more specifically exceeds 1,770° C., and still more specifically exceeds 1,750° C., there is a risk that the plasma etching resistance of the thermal spray coating against low-power plasma may slightly deteriorate. The reason for this is that as the sintering temperature increases, it is easier for the sintering to become excessive. If the sintering is excessive, it is more difficult for the granulated and sintered yttria particles to be softened or melted by the thermal spray flame. As a consequence, unmelted or non-softened granulated and sintered yttria particles become mixed in the thermal spray coating, whereby the density of the thermal spray coating decreases and the plasma etching resistance of the thermal spray coating against low-power plasma deteriorates. In addition, if the softening or melting of the granulated and sintered yttria particles by the thermal spray flame becomes more difficult, deposit efficiency (spray yield) also decreases. Therefore, from the perspective of improving the plasma etching resistance of the thermal spray coating against low-power plasma and improving the deposit efficiency of the thermal spray powder, the sintering temperature is preferably no greater than 1,800° C., more preferably no greater than 1,770° C., and most preferably no greater than 1,750° C.

If the maximum temperature holding time (sintering time) when sintering the granulated powder is less than 12 minutes, more specifically less than 30 minutes, and still more specifically less than 1 hour, grain growth of the primary particles is liable to be insufficient, whereby disintegration of the granulated and sintered yttria particles is more likely to occur. Therefore, to suppress disintegration of the granulated and sintered yttria particles, the sintering time is preferably 12 minutes or more, more preferably 30 minutes or more, and most preferably 1 hour or more.

On the other hand, if the sintering time is more than 30 hours, more specifically more than 20 hours, and still more specifically more than 10 hours, grain growth of the primary particles generally reaches saturation, and is thus not effective. Therefore, from the perspective of effective sintering, the sintering time is preferably no more than 30 hours, more preferably no more than 20 hours, and most preferably no more than 10 hours.

To obtain a thermal spray coating that has excellent plasma etching resistance against low-power plasma, it is necessary for the average particle size of the primary particles constituting the granulated and sintered yttria particles to be 3 µm or greater. If less than 3 µm, it is difficult to form a thermal spray coating that has excellent plasma etching resistance against low-power plasma from the thermal spray powder. The reason for this is that as the average particle size of the primary particles constituting the granulated and sintered yttria particles becomes smaller, the inter-lamellar region in the thermal spray coating relatively increases. As described above, the inter-lamellar region contains a large number of crystal defects, and since etching of the thermal spray coating by the plasma preferentially proceeds from defective portions in the thermal spray coating, a thermal spray coating having a higher relative volume of inter-lamellar region ratio tends to have a lower plasma etching resistance against low-power plasma.

However, if the average particle size of the primary particles constituting the granulated and sintered yttria particles is less than 4 µm, even if 3 µm or greater, the relative volume of the inter-lamellar region in the thermal spray coating may be slightly higher. As a consequence, there is a risk that the plasma etching resistance of the thermal spray coating against low-power plasma may slightly deteriorate. Therefore, from the perspective of improving plasma etching resistance of the thermal spray coating against low-power plasma, the average particle size of the primary particles constituting the granulated and sintered yttria particles is preferably 4 µm or greater.

To obtain a thermal spray coating that has excellent plasma etching resistance against low-power plasma, it is necessary for the average particle size of the primary particles constituting the granulated and sintered yttria particles to be no greater than 8 µm. If more than 8 µm, it is difficult to form a thermal spray coating that has excellent plasma etching resistance against low-power plasma from the thermal spray powder. The reason for this is that as the average particle size of the primary particles constituting the granulated and sintered yttria particles becomes larger, the thickness of the inter-lamellar region in the thermal spray coating increases. As described above, the inter-lamellar region contains a large number of crystal defects, and since etching of the thermal spray coating by the plasma preferentially proceeds from defective portions in the thermal spray coating, a thermal spray coating which comprises an inter-lamellar region having a large thickness tends to have a lower plasma etching resistance against low-power plasma.

However, if the average particle size of the primary particles constituting the granulated and sintered yttria particles exceeds 7 μm, even if no greater than 8 μm, there is a risk that the thickness of the inter-lamellar region in the thermal spray coating is slightly large. As a consequence, there is a risk that the plasma etching resistance of the thermal spray coating against low-power plasma may slightly deteriorate. Therefore, from the perspective of improving plasma etching resistance of the thermal spray coating against low-power plasma, the average particle size of the primary particles constituting the granulated and sintered yttria particles is preferably no greater than 7 μm.

If the average particle size of the granulated and sintered yttria particles is less than 20 μm, more specifically less than 22 μm, still more specifically less than 25 μm, and even more specifically less than 28 μm, there is a risk of a large quantity of comparatively fine particles being contained in the granulated and sintered yttria particles, whereby there is a risk that a thermal spray powder with good flowability cannot be obtained. Therefore, from the perspective of improving the flowability of the thermal spray powder, the average particle size of the granulated and sintered yttria particles is preferably 20 μm or greater, more preferably 22 μm or greater, still more preferably 25 μm or greater and even more preferably 28 μm or greater. It is noted that as flowability of the thermal spray powder decreases, the supply of thermal spray powder to the thermal spray flame tends to become more unstable, whereby the thermal spray coating thickness is more likely to be uneven and the plasma etching resistance of the thermal spray coating more likely to be uneven.

On the other hand, if the average particle size of the granulated and sintered yttria particles exceeds 60 μm, more specifically exceeds 57 μm, still more specifically exceeds 55 μm, and even more specifically exceeds 52 μm, there is a risk that it is more difficult for the granulated and sintered yttria particles to be sufficiently softened or melted by the thermal spray flame, whereby as a consequence there is a risk that the deposit efficiency of the thermal spray powder may deteriorate. Therefore, to improve the deposit efficiency, the average particle size of the granulated and sintered yttria particles is preferably no greater than 60 μm, more preferably no greater than 57 μm, still more preferably no greater than 55 μm, and even still more preferably no greater than 52 μm.

If the cumulative volume of the pores having a diameter of 6 μm or less in the granulated and sintered yttria particles is less than 0.1 cm$^3$/g, more specifically less than 0.11 cm$^3$/g, and still more specifically less than 0.12 cm$^3$/g, there is a risk of the plasma etching resistance of the thermal spray coating against low-power plasma slightly deteriorating. Therefore, from the perspective of improving plasma etching resistance of the thermal spray coating against low-power plasma, the cumulative volume of the pores having a diameter of 6 μm or less in the granulated and sintered yttria particles is preferably no less than 0.1 cm$^3$/g, more preferably no less than 0.11 cm$^3$/g, and most preferably no less than 0.12 cm$^3$/g. It should be noted that a smaller cumulative volume of pores having a diameter of 6 μm or less in the granulated and sintered yttria particles tends to relatively increase the inter-lamellar region in the thermal spray coating. As described above, the inter-lamellar region contains a large number of crystal defects, and since etching of the thermal spray coating by the plasma preferentially proceeds from defective portions in the thermal spray coating, a thermal spray coating having a higher relative volume of inter-lamellar region tends to have a lower plasma etching resistance against low-power plasma.

On the other hand, if the cumulative volume of the pores having a diameter of 6 μm or less in the granulated and sintered yttria particles exceeds 0.3 cm$^3$/g, more specifically exceeds 0.28 cm$^3$/g, and still more specifically exceeds 0.27 cm$^3$/g, there is a risk of the density of the granulated and sintered yttria particles decreasing, whereby as a consequence there is a risk that the density of the thermal spray coating formed from the thermal spray powder may also decrease. Therefore, to improve the density of the thermal spray coating, the cumulative volume of the pores having a diameter of 6 μm or less in the granulated and sintered yttria particles is preferably no greater than 0.3 cm$^3$/g, more preferably no greater than 0.28 cm$^3$/g, and still more preferably no greater than 0.27 cm$^3$/g. It is noted that a thermal spray coating with a low density has a high porosity, and that since etching of the thermal spray coating by the plasma preferentially proceeds from the pore vicinity in the thermal spray coating, a thermal spray coating having a high porosity tends to have a lower plasma etching resistance against low-power plasma.

If the peak of the pore size distribution in the granulated and sintered yttria particles is less than 0.4 μm, more specifically less than 0.43 μm, and still more specifically less than 0.45 μm, there is a risk of the plasma etching resistance of the thermal spray coating against low-power plasma slightly deteriorating. Therefore, from the perspective of improving plasma etching resistance of the thermal spray coating against low-power plasma, the peak of the pore size distribution in the granulated and sintered yttria particles is preferably no less than 0.4 μm, more preferably no less than 0.43 μm, and most preferably no less than 0.45 μm. It is noted that as the peak of the pore size distribution in the granulated and sintered yttria particles decreases, there is a tendency for the ratio of the inter-lamellar region in the thermal spray coating to increase. As described above, the inter-lamellar region contains a large number of crystal defects, and since etching of the thermal spray coating by the plasma preferentially proceeds from defective portions in the thermal spray coating, a thermal spray coating having a higher relative volume of inter-lamellar region tends to have a lower plasma etching resistance against low-power plasma.

On the other hand, if the peak of the pore size distribution in the granulated and sintered yttria particles exceeds 4 μm, more specifically exceeds 3.8 μm, and still more specifically exceeds 3.7 μm, there is a risk of the density of the granulated and sintered yttria particles decreasing, whereby as a consequence there is a risk that the density of the thermal spray coating formed from the thermal spray powder may also decrease. Therefore, to improve the density of the thermal spray coating, the peak of the pore size distribution in the granulated and sintered yttria particles is preferably no greater than 4 μm, more preferably no greater than 3.8 μm, and most preferably no greater than 3.7 μm. As described above, a thermal spray coating with a low density has a high porosity, and since etching of the thermal spray coating by the plasma preferentially proceeds from the pore vicinity in the thermal spray coating, a thermal spray coating having a high porosity tends to have a lower plasma etching resistance against low-power plasma.

The apparent density of the granulated and sintered yttria particles is preferably between 0.8 and 1.4 inclusive. If the apparent density is less than 0.8, a phenomenon known as "spitting" is more likely to occur during thermal spraying of the thermal spray powder. The term "spitting" refers to the phenomenon wherein deposits of excessively molten thermal spray powder fall from the nozzle inner wall of the spray gun and are spat out towards the thermal spray subject. If spitting occurs during thermal spraying, the uniformity of the coating thickness and the uniformity of the lamellar structure at the coated plane of the obtained thermal spray coating deteriorate, and the uniformity of the plasma etching resistance also deteriorates. The reason why spitting is more likely to occur when the apparent density of the granulated and sintered yttria particles is less than 0.8 is that, as the apparent density of the granulated and sintered yttria particles decreases, fine particles at risk of being excessively melted by the thermal spray flame are more likely to appear as a result of disintegration of the granulated and sintered yttria particles. On the other hand, if the apparent density of the granulated and sintered yttria particles exceeds 1.4, there is a risk that it is more difficult for the granulated and sintered yttria particles to be sufficiently softened or melted by the thermal spray flame, whereby as a consequence there is a risk that the deposit efficiency of the thermal spray powder may deteriorate.

The crushing strength of the granulated and sintered yttria particles is preferably between 8 and 15 MPa inclusive. If the crushing strength is less than 8 MPa, spitting is more likely to occur during thermal spraying of the thermal spray powder. The reason why spitting is more likely to occur when the crushing strength of the granulated and sintered yttria particles is less than 8 MPa is that, as the crushing strength of the granulated and sintered yttria particles decreases, fine particles at risk of being excessively melted by the thermal spray flame are more likely to appear as a result of disintegration of the granulated and sintered yttria particles. On the other hand, if the crushing strength of the granulated and sintered yttria particles exceeds 15 MPa, there is a risk that it is more difficult for the granulated and sintered yttria particles to be sufficiently softened or melted by the thermal spray flame, whereby as a consequence there is a risk that the deposit efficiency of the thermal spray powder may deteriorate.

The thermal spray powder according to the second embodiment is used in applications for forming a thermal spray coating by plasma spraying or some other thermal spraying process. The ambient pressure during plasma spraying of the thermal spray powder is preferably atmospheric pressure. In other words, the thermal spray powder is preferably used in atmospheric-pressure plasma spraying applications. If the ambient pressure during plasma spraying is not atmospheric pressure, and especially in the case of a low pressure atmosphere, there is a risk that the plasma etching resistance against low-power plasma of the resultant thermal spray coating may slightly deteriorate. If the thermal spray powder is plasma sprayed under a low pressure, there is a risk that reduction of the yttria in the thermal spray powder will occur during the thermal spraying, whereby as a consequence lattice defects due to oxygen deficiency are more likely to be contained in the thermal spray coating. As described above, since etching of the thermal spray coating by the plasma preferentially proceeds from defective portions in the thermal spray coating, there is a tendency for a thermal spray coating formed by low pressure plasma spraying to have worse plasma etching resistance against low-power plasma than that for a thermal spray coating formed by atmospheric-pressure plasma spraying.

Concerning a thermal spray coating formed from the thermal spray powder according to the second embodiment, if the porosity of the thermal spray coating is less than 2%, more specifically less than 3%, and even more specifically less than 5%, the thermal spray coating is too dense, whereby there is the risk that the thermal spray coating becomes more susceptible to peeling from residual stress in the thermal spray coating. Therefore, the porosity of the thermal spray coating is preferably 2% or greater, more preferably 3% or greater and most preferably 5% or greater.

On the other hand, if the porosity of the thermal spray coating exceeds 17%, more specifically exceeds 15%, and even more specifically exceeds 10%, there is a risk that the plasma etching resistance of the thermal spray coating against low-power plasma may slightly deteriorate. The reason for this is that, as described above, etching of the thermal spray coating by the plasma preferentially proceeds from the pore vicinity in the thermal spray coating. Further, if porosity of the thermal spray coating is within the above-described range, there is a risk that through-holes will be contained in the thermal spray coating. As a consequence, there is a risk that etching damage of the substrate due to the plasma cannot be sufficiently prevented. Therefore, from the perspectives of improving the plasma etching resistance of the thermal spray coating against low-power plasma and of preventing through-holes, the porosity of the thermal spray coating is preferably no greater than 17%, more preferably no greater than 15%, and still more preferably no greater than 10%.

The following advantages can be obtained from the second embodiment.

With the thermal spray powder according to the second embodiment, sintering of a granulated powder produced from a raw material powder is conducted in air or oxygen, and the average particle size of the primary particles constituting the granulated and sintered yttria particles is set at between 3 and 8 μm inclusive. For this reason, a thermal spray coating formed from the thermal spray powder according to the second embodiment has excellent plasma etching resistance against low-power plasma. In other words, the thermal spray powder according to the second embodiment is suitable for the formation of a thermal spray coating which has excellent plasma etching resistance against low-power plasma.

The first embodiment and the second embodiment may be changed in the following manner.

The thermal spray powder may comprise components other than the granulated and sintered yttria particles. However, it is preferable to have a small amount as possible of the components other than the granulated and sintered yttria particles contained in the thermal spray powder.

The granulated and sintered yttria particles may comprise components other than yttria. However, the yttria content in the granulated and sintered yttria particles is preferably no less than 90%, more preferably no less than 95%, and most preferably no less than 99%. While there are no limitations on the components of the granulated and sintered yttria particles other than yttria, rare earth oxides are preferable.

Next, the Examples and Comparative Examples for the first embodiment will be explained.

The thermal spray powders of Examples 1 to 11 and Comparative Examples 1 to 4 consisting of granulated and sintered yttria particles were produced by granulating and sintering a yttria powder (raw material powder). The maximum temperature holding time during the sintering was 2 hours. Next, thermal spray coatings were formed by plasma spraying each of the thermal spray powders. Details of the thermal spray powders and thermal spray coatings are as illustrated in Table 1. The thermal spray conditions when forming the thermal spray coatings (atmospheric pressure plasma spraying conditions and low pressure plasma spraying conditions) are as illustrated in Table 2.

The column entitled "Average particle size A of the raw material powder" in Table 1 represents the average particle size of the raw material powder for each thermal spray powder, as measured using a laser diffraction/dispersion type of particle size distribution measuring instrument "LA-300" manufactured by Horiba Ltd.

The column entitled "Average particle size B of the primary particles constituting the granulated and sintered particles" in Table 1 represents the average particle size of the primary particles constituting the granulated and sintered yttria particles measured using a field-emission scanning electron microscope (FE-SEM). Specifically, this represents the mean of oriented diameters (Feret's diameter) measured by randomly selecting 10 granulated and sintered yttria particles from each thermal spray powder, then randomly selecting 50 primary particles from each of the 10 randomly selected granulated and sintered yttria particles, and measuring the total of 500 primary particles for the each thermal spray powder. The "oriented diameter" is the distance between two imaginary lines that sandwich and extend parallel from a particle.

The column entitled "B/A" in Table 1 represents the ratio of the average particle size of the primary particles constituting the granulated and sintered yttria particles of the subject thermal spray powder with respect to the average particle size of the raw material powder for each of the thermal spray powders.

The column entitled "Sintering atmosphere" in Table 1 represents the type of ambient gas during the sintering of the raw material powder after granulation for producing each of the thermal spray powders.

The column entitled "Sintering temperature" in Table 1 represents the maximum atmosphere temperature during the sintering step for the sintering of the raw material powder after granulation for producing each of the thermal spray powders.

The column entitled "Average particle size of the granulated and sintered particles" in Table 1 represents average particle size of the granulated and sintered yttria particles of each of the thermal spray powders measured using a laser diffraction/dispersion type of particle size distribution measuring instrument "LA-300" manufactured by Horiba Ltd.

The column entitled "Cumulative volume of pores having a diameter of 3 µm or less" in Table 1 represents the cumulative volume of pores having a diameter of 3 µm or less in the granulated and sintered yttria particles of each thermal spray powder (per gram of granulated and sintered yttria particles) measured using a mercury intrusion porosimeter "Poresizer 9320" manufactured by Shimadzu Corporation.

The column entitled "Peak of pore size distribution" in Table 1 represents the peak of pore size distribution in the granulated and sintered yttria particles of each of the thermal spray powders measured using a "Poresizer 9320". In general, two peaks are obtained from measuring the pore size distribution of the granulated and sintered yttria particles. Among these two peaks, the peak that appears in the large diameter area (for example, approximately 10 µm) is generated by gaps between the granulated and sintered yttria particles, while the peak generated by the pores in the granulated and sintered yttria particles appears only in the small diameter area.

The column entitled "Apparent Density" in Table 1 represents the apparent density of the granulated and sintered yttria particles for each of the thermal spraying powders measured in accordance with JIS-Z-2504.

The column entitled "Angle of repose" in Table 1 represents the angle of repose of the granulated and sintered yttria particles for each of the thermal spray powders measured using an A.B.D-powder characteristic measuring instrument "A.B.D-72 model" manufactured by Tsutsui Rikagaku Kikai Co., Ltd.

The column entitled "Thermal spraying atmosphere" in Table 1 represents the ambient pressure during plasma spraying each of the thermal spray powders for forming the thermal spray coatings.

The column entitled "Deposit efficiency" in Table 1 represents the results of evaluation into the deposit efficiency, which is the weight of the thermal spray coatings formed by thermal spraying each of the thermal spray powders with respect to the weight of the thermal spray powders used. In this column, "1" (excellent) indicates a deposit efficiency of 50% or greater, "2" (good) indicates a deposit efficiency of 40% or greater but less than 50%, and "3" (poor) indicates a deposit efficiency of less than 40%.

The column entitled "Density" in Table 1 represents the results of an evaluation into the density of the thermal spray coatings formed by the thermal spraying of each of the thermal spray powders. Specifically, each thermal spray coating was cut along a plane perpendicular to its upper surface. After the cut surface was mirror polished using colloidal silica having an average particle size of 6 nm, the porosity of the thermal spray coating at the cut surface was measured using an image analysis processor "NSFJ1-A" manufactured by N Support Corporation. In the "Density" column, "1" (excellent) indicates a porosity of less than 6%, "2" (good) indicates a porosity of 6% or more but less than 12%, and "3" (poor) indicates a porosity of 12% or more.

The column entitled "Plasma etching resistance" in Table 1 represents the results of evaluation into the plasma etching resistance of thermal spray coatings formed by thermal spraying each of the thermal spray powders. Specifically, first, each thermal spray coating was mirror polished using colloidal silica having an average particle size of 0.06 µm. A portion of the surface of the polished thermal spray coatings was then masked with polyimide tape, after which the entire surface of the subject thermal spray coatings was subjected to plasma etching under the conditions illustrated in Table 3. The size of the step between the masked portion and the unmasked portion was measured using the profiler "Alpha Step" manufactured by KLA Tencor Corporation. In the "Plasma etching resistance" column, "1" (excellent) indicates a step magnitude of less than 12 nm/min, "2" (good) indicates a step magnitude of 12 nm/min or more but less than 14 nm/min, and "3" (poor) indicates a step magnitude of 14 nm/min or more.

TABLE 1

| | Average particle size A of the raw material powder (μm) | Average particle size B of the primary particles constituting the granulated and sintered particles (μm) | B/A | Sintering atmosphere | Sintering temperature (° C.) | Average particle size of the granulated and sintered particles (μm) | Cumulative volume of pores having a diameter of 3 μm or less (cm³/g) | Peak of pore size distribution (μm) | Apparent density | Angle of repose (°) | Thermal spraying atmosphere | Deposit efficiency | Density | Plasma etching resistance |
|---|---|---|---|---|---|---|---|---|---|---|---|---|---|---|
| Ex. 1 | 0.4 | 0.5 | 1.25 | air | 1650 | 44 | 0.07 | 0.15 | 1.9 | 36 | atmospheric pressure | 1 | 1 | 2 |
| Ex. 2 | 0.9 | 1.1 | 1.22 | air | 1700 | 40 | 0.09 | 0.22 | 1.5 | 40 | atmospheric pressure | 1 | 1 | 1 |
| Ex. 3 | 1.2 | 1.5 | 1.25 | air | 1700 | 40 | 0.14 | 1.70 | 1.2 | 43 | atmospheric pressure | 2 | 1 | 2 |
| C. Ex. 1 | 1.0 | 1.1 | 1.10 | air | 1550 | 39 | 0.18 | 0.97 | 1.1 | 43 | atmospheric pressure | 2 | 3 | 3 |
| C. Ex. 2 | 0.3 | 0.4 | 1.33 | air | 1600 | 40 | 0.11 | 0.35 | 1.2 | 44 | atmospheric pressure | 2 | 2 | 3 |
| C. Ex. 3 | 1.5 | 1.8 | 1.20 | air | 1700 | 38 | 0.16 | 1.85 | 1.2 | 43 | atmospheric pressure | 2 | 2 | 3 |
| Ex. 4 | 0.7 | 0.8 | 1.14 | air | 1450 | 43 | 0.22 | 0.48 | 1.1 | 46 | atmospheric pressure | 2 | 2 | 2 |
| C. Ex. 4 | 0.9 | 1.1 | 1.22 | argon | 1700 | 41 | 0.11 | 0.27 | 1.5 | 41 | atmospheric pressure | 1 | 2 | 3 |
| Ex. 5 | 0.9 | 1.1 | 1.22 | air | 1700 | 24 | 0.10 | 0.24 | 1.8 | 43 | atmospheric pressure | 1 | 1 | 2 |
| Ex. 6 | 0.9 | 1.1 | 1.22 | air | 1700 | 17 | 0.10 | 0.24 | 1.8 | 46 | atmospheric pressure | 1 | 1 | 2 |
| Ex. 7 | 0.9 | 1.1 | 1.22 | air | 1700 | 56 | 0.10 | 0.23 | 1.1 | 40 | atmospheric pressure | 2 | 2 | 2 |
| Ex. 8 | 0.9 | 1.1 | 1.22 | air | 1700 | 65 | 0.10 | 0.23 | 1.1 | 39 | atmospheric pressure | 2 | 2 | 2 |
| Ex. 9 | 1.3 | 1.5 | 1.15 | air | 1700 | 50 | 0.12 | 2.10 | 1.4 | 39 | atmospheric pressure | 1 | 2 | 2 |
| Ex. 10 | 0.9 | 1.1 | 1.22 | air | 1700 | 40 | 0.09 | 0.22 | 1.5 | 40 | low pressure (0.6 atm) | 2 | 1 | 2 |
| Ex. 11 | 0.3 | 0.6 | 2.00 | air | 1700 | 40 | 0.02 | 0.05 | 1.7 | 37 | atmospheric pressure | 2 | 1 | 2 |

TABLE 2

| Atmospheric Pressure Plasma Spraying Conditions | |
|---|---|
| Substrate: | An aluminum alloy (A6061) sheet (50 mm × 75 mm × 5 mm) which had been blast treated using a brown alumina abrasive (A#40) |
| Spray gun: | "SG-100" manufactured by Praxair |
| Powder feeder: | "Model 1264" manufactured by Praxair |
| Ar gas pressure: | 50 psi (0.34 MPa) |
| He gas pressure: | 50 psi (0.34 MPa) |
| Voltage: | 37.0 V |
| Current: | 900 A |
| Thermal spraying distance: | 120 mm |
| Thermal spray powder feed amount: | 20 g per minute |
| Low Pressure Plasma Spraying Conditions | |
| Substrate: | An aluminum alloy (A6061) sheet (50 mm × 75 mm × 5 mm) which had been blast treated using a brown alumina abrasive (A#40) |
| Spray gun: | "F4" manufactured by Sulzer-Metco |
| Powder feeder: | "Twin 10" manufactured by Sulzer-Metco |
| Ar gas flow rate: | 42 L/min |
| He gas flow rate: | 10 L/min |
| Voltage: | 43.0 V |
| Current: | 620 A |
| Thermal spraying distance: | 200 mm |
| Thermal spray powder feed amount: | 20 g per minute |

TABLE 3

| | |
|---|---|
| Etching apparatus: | Reactive ion etching apparatus "NLD-800" manufactured by Ulvac Inc. |
| Etching gas: | $CF_4$ |
| Etching gas flow rate: | 0.054 L/min |
| Chamber pressure: | 1 Pa |
| Plasma power: | 400 W |
| Plasma bombardment region: | 200 mm diameter |
| Plasma power per thermal spray coating unit area: | 1.3 W/cm² |
| Etching time: | 1 hour |

As illustrated in Table 1, the thermal spray coatings of Examples 1 to 11 attained results which would be satisfactory for practical use as concerns plasma etching resistance against a high-power plasma in which the plasma power being applied on a thermal spray coating per unit area is 1.3

W/cm². In contrast, the thermal spray coatings of Comparative Examples 1 to 4 could not attain results which would be satisfactory for practical use as concerns the same plasma etching resistance.

Next, the Examples and Comparative Examples for the second embodiment will be explained.

The thermal spray powders of Examples 101 to 111 and Comparative Examples 101 to 106 consisting of granulated and sintered yttria particles were produced by granulating and sintering a yttria powder (raw material powder). The maximum temperature holding time during the sintering was 2 hours. Next, thermal spray coatings were formed by plasma spraying each of the thermal spray powders. Details of the thermal spray powders and thermal spray coatings are as illustrated in Table 4. The thermal spray conditions when forming the thermal spray coatings (atmospheric pressure plasma spraying conditions and low pressure plasma spraying conditions) are as illustrated in Table 5.

The column entitled "Average particle size of the raw material powder" in Table 4 represents the average particle size of the raw material powder for each of the thermal spraying powders, which was measured using a laser diffraction/dispersion type of particle size distribution measuring instrument "LA-300", manufactured by Horiba Ltd.

The column entitled "Average particle size of the primary particles constituting the granulated and sintered particles" in Table 4 represents the average particle size of the primary particles constituting the granulated and sintered yttria particles, which was measured using a field-emission scanning electron microscope (FE-SEM). Specifically, this represents the mean of oriented diameters (Feret's diameter) measured by randomly selecting 10 granulated and sintered yttria particles from each thermal spray powder, then randomly selecting 50 primary particles for each of the 10 randomly selected granulated and sintered yttria particles, and measuring the total of 500 primary particles for the each thermal spray powder. The "oriented diameter" is the distance between two imaginary lines that sandwich and extend parallel from a particle.

The column entitled "Sintering atmosphere" in Table 4 represents the kind of ambient gas during the sintering of the raw material powder after granulation for producing each of the thermal spray powders.

The column entitled "Sintering temperature" in Table 4 represents the maximum atmosphere temperature during the sintering step for the sintering of the raw material powder after granulation for producing each of the thermal spray powders.

The column entitled "Average particle size of the granulated and sintered particles" in Table 4 represents the average particle size of the granulated and sintered yttria particles of each of the thermal spray powders, which was measured using a laser diffraction/dispersion type of particle size distribution measuring instrument "LA-300" manufactured by Horiba Ltd.

The column entitled "Cumulative volume of pores having a diameter of 6 µm or less" in Table 4 represents the cumulative volume of pores having a diameter of 6 µm or less in the granulated and sintered yttria particles of each thermal spray powder (per gram of granulated and sintered yttria particles) measured using a mercury intrusion porosimeter "Poresizer 9320" manufactured by Shimadzu Corporation.

The column entitled "Peak of pore size distribution" in Table 4 represents the peak of pore size distribution in the granulated and sintered yttria particles of each of the thermal spray powders measured using a "Poresizer 9320". In general, two peaks are obtained from measuring the pore size distribution of the granulated and sintered yttria particles. Among these two peaks, the peak that appears in the large diameter area (for example, approximately 10 µm) is generated by gaps between the granulated and sintered yttria particles, while the peak generated by the pores in the granulated and sintered yttria particles appears only in the small diameter area.

The column entitled "Apparent density" in Table 4 represents the apparent density of the granulated and sintered yttria particles for each of the thermal spraying powders measured in accordance with JIS-Z-2504.

The column entitled "Crushing strength" in Table 4 represents the crushing strength δ (MPa) of the granulated and sintered yttria particles in each of the thermal spraying powders calculated in accordance with the equation: $\delta = 2.8 \times L / \Pi / d^2$. In the equation, L represents the critical load (N), and d represents the average particle size (mm) of the granulated and sintered yttria particles in each of the thermal spraying powders. The critical load is the magnitude of the compressive load applied to the granulated and sintered yttria particles at a point in time where the amount of displacement of an indenter is rapidly increased when the compressive load that increases at a constant rate is applied to the granulated and sintered yttria particles by the indenter. The critical load was measured using a micro compression testing instrument "MCTE-500" manufactured by Shimadzu Corporation.

The column entitled "Thermal spraying atmosphere" in Table 4 represents the ambient pressure during plasma spraying each of the thermal spray powders for forming the thermal spray coatings.

The column entitled "Deposit efficiency" in Table 4 represents the results of evaluation into the deposit efficiency, which is the weight of the thermal spray coatings formed by thermal spraying the respective thermal spray powders with respect to the weight of the thermal spray powders used for thermal spraying. In this column, "1" (excellent) indicates a deposit efficiency of 50% or greater, "2" (good) indicates a deposit efficiency of 40% or greater but less than 50%, and "3" (poor) indicates a deposit efficiency of less than 40%.

The column entitled "Density" in Table 4 represents the results of an evaluation into the density of the thermal spray coatings formed by the thermal spraying of the respective thermal spray powders. Specifically, each thermal spray coating was cut along a plane perpendicular to its upper surface. After the cut surface was mirror polished using colloidal silica having an average particle size of 6 nm, the porosity of the thermal spray coating at the cut surface was measured using an image analysis processor "NSFJ1-A" manufactured by N Support Corporation. In the "Density" column, "1" (excellent) indicates a porosity of less than 6%, "2" (good) indicates a porosity of 6% or more but less than 12%, and "3" (poor) indicates a porosity of 12% or more.

The column entitled "Plasma etching resistance" in Table 4 represents the results of evaluation into the plasma etching resistance of thermal spray coatings formed by thermal spraying each of the thermal spray powders. Specifically, first, each thermal spray coating was mirror polished using colloidal silica having an average particle size of 0.06 µm. A portion of the surface of the polished thermal spray coatings was then masked with polyimide tape, after which the entire surface of the subject thermal spray coatings was subjected to plasma etching under the conditions illustrated in Table 6. The size of the step between the masked portion and the unmasked portion was measured using the profiler "Alpha Step" manufactured by KLA-Tencor Corporation. In the "Plasma etching resistance" column, "1" (excellent) indicates a step magnitude of less than 280 nm, "2" (good) indicates a step magnitude of 280 nm or more but less than 320 nm, and "3" (poor) indicates a step magnitude of 320 nm or more.

TABLE 4

| | Average particle size of the raw material powder (μm) | Average particle size of the primary particles constituting the granulated and sintered particles (μm) | Sintering atmosphere | Sintering temperature (°C.) | Average particle size of the granulated and sintered particles (μm) | Cumulative volume of pores having a diameter of 6 μm or less (cm³/g) | Peak of pore size distribution (μm) | Apparent density | Crushing strength (MPa) | Thermal spraying atmosphere | Deposit efficiency | Density | Plasma etching resistance |
|---|---|---|---|---|---|---|---|---|---|---|---|---|---|
| Ex. 101 | 2.1 | 3.4 | air | 1700 | 40 | 0.12 | 0.95 | 1.2 | 14 | atmospheric pressure | 1 | 1 | 2 |
| Ex. 102 | 4.0 | 4.8 | air | 1700 | 42 | 0.16 | 1.67 | 1.1 | 12 | atmospheric pressure | 1 | 1 | 1 |
| Ex. 103 | 7.2 | 8.0 | air | 1700 | 44 | 0.24 | 2.90 | 0.9 | 9 | atmospheric pressure | 2 | 2 | 2 |
| C. Ex. 101 | 1.8 | 2.7 | air | 1650 | 39 | 0.10 | 0.74 | 1.3 | 15 | atmospheric pressure | 1 | 1 | 3 |
| C. Ex. 102 | 8.4 | 9.0 | air | 1700 | 40 | 0.27 | 3.80 | 0.8 | 8 | atmospheric pressure | 2 | 1 | 3 |
| C. Ex. 103 | 2.1 | 2.7 | air | 1600 | 38 | 0.21 | 1.45 | 0.9 | 8 | atmospheric pressure | 2 | 3 | 3 |
| C. Ex. 104 | 7.7 | 8.6 | air | 1700 | 43 | 0.28 | 3.10 | 0.8 | 9 | atmospheric pressure | 3 | 3 | 3 |
| C. Ex. 105 | 4.0 | 4.8 | argon | 1700 | 41 | 0.15 | 1.59 | 1.1 | 10 | atmospheric pressure | 2 | 1 | 3 |
| Ex. 104 | 4.0 | 4.5 | air | 1500 | 39 | 0.29 | 1.96 | 0.9 | 7 | atmospheric pressure | 2 | 2 | 2 |
| Ex. 105 | 4.0 | 4.8 | air | 1700 | 24 | 0.15 | 1.64 | 1.2 | 12 | atmospheric pressure | 1 | 1 | 2 |
| Ex. 106 | 4.0 | 4.8 | air | 1700 | 17 | 0.17 | 1.63 | 1.2 | 12 | atmospheric pressure | 1 | 1 | 2 |
| Ex. 107 | 4.0 | 4.8 | air | 1700 | 56 | 0.16 | 1.67 | 1.1 | 12 | atmospheric pressure | 2 | 2 | 2 |
| Ex. 108 | 4.0 | 4.8 | air | 1700 | 65 | 0.15 | 1.70 | 1.0 | 12 | atmospheric pressure | 2 | 2 | 2 |
| Ex. 109 | 2.0 | 3.8 | air | 1750 | 40 | 0.08 | 0.65 | 1.3 | 31 | atmospheric pressure | 2 | 1 | 2 |
| C. Ex. 106 | 1.0 | 2.1 | air | 1700 | 41 | 0.04 | 0.31 | 1.8 | 36 | atmospheric pressure | 1 | 1 | 3 |
| Ex. 110 | 7.6 | 7.9 | air | 1600 | 38 | 0.35 | 4.20 | 0.7 | 7 | atmospheric pressure | 2 | 2 | 2 |
| Ex. 111 | 4.0 | 4.8 | air | 1700 | 42 | 0.16 | 1.67 | 1.1 | 12 | low pressure (0.6 atm) | 1 | 1 | 2 |

TABLE 5

| Atmospheric Pressure Plasma Spraying Conditions | |
|---|---|
| Substrate: | An aluminum alloy (A6061) sheet (50 mm × 75 mm × 5 mm) which had been blast treated using a brown alumina abrasive (A#40) |
| Spray gun: | "SG-100" manufactured by Praxair |
| Powder feeder: | "Model 1264" manufactured by Praxair |
| Ar gas pressure: | 50 psi (0.34 MPa) |
| He gas pressure: | 50 psi (0.34 MPa) |
| Voltage: | 37.0 V |
| Current: | 900 A |
| Thermal spraying distance: | 120 mm |
| Thermal spray powder feed amount: | 20 g per minute |
| Low Pressure Plasma Spraying Conditions | |
| Substrate: | An aluminum alloy (A6061) sheet (50 mm × 75 mm × 5 mm) which had been blast treated using a brown alumina abrasive (A#40) |
| Spray gun: | "F4" manufactured by Sulzer-Metco |
| Powder feeder: | "Twin 10" manufactured by Sulzer-Metco |
| Ar gas flow rate: | 42 L/min |
| He gas flow rate: | 10 L/min |
| Voltage: | 43.0 V |
| Current: | 620 A |
| Thermal spraying distance: | 200 mm |
| Thermal spray powder feed amount: | 20 g per minute |

TABLE 6

| | |
|---|---|
| Etching apparatus: | reactive ion etching apparatus "RIE-200" manufactured by Samco Inc. |
| Etching gas: | $CF_4$ |
| Etching gas flow rate: | 0.054 L/min |
| Chamber pressure: | 5 Pa |
| Plasma power: | 100 W |
| Plasma bombardment region: | diameter 200 mm |
| Plasma power per thermal spray coating unit area: | 0.3 W/cm$^2$ |
| Etching time: | 8 hours |

As illustrated in Table 4, the thermal spray coatings of Examples 101 to 111 attained results which would be satisfactory for practical use as concerns plasma etching resistance against a low-power plasma in which the plasma power being applied on a thermal spray coating per unit area is 0.3 W/cm². In contrast, the thermal spray coatings of Comparative Examples 101 to 106 could not attain results which would be satisfactory for practical use as concerns the same plasma etching resistance.

The invention claimed is:

1. A thermal spray powder comprising granulated and sintered yttria particles obtained by granulating and sintering a raw material powder in air, wherein the primary particles constituting the granulated and sintered yttria particles have an average particle size between 0.5 and 1.5 µm inclusive, and 1.15 times or more as large as the raw material powder.

2. The thermal spray powder according to claim 1, wherein the average particle size of the granulated and sintered yttria particles is between 20 and 60 µm inclusive.

3. The thermal spray powder according to claim 1, wherein pores having a diameter of 3 µm or less in the granulated and sintered yttria particles have a cumulative volume of 0.2 cm³/g or less.

4. The thermal spray powder according to claim 1, wherein the granulated and sintered yttria particles have a pore size distribution with a peak in a range between 0.06 and 2 µm inclusive.

5. The thermal spray powder according to claim 1, wherein the granulated and sintered yttria particles have an apparent density of 1.2 or more.

6. The thermal spray powder according to claim 1, wherein the average particle size of the primary particles constituting the granulated and sintered yttria particles is 1.25 times or less as large as the raw material powder.

7. The thermal spray powder according to claim 1, wherein the average particle size of the primary particles constituting the granulated and sintered yttria particles is 1.22 times or more as large as the raw material powder.

8. A method for forming a thermal spray coating comprising forming a thermal spray coating by atmospheric-pressure plasma spraying of a thermal spray powder, the thermal spray powder comprising granulated and sintered yttria particles obtained by granulating and sintering a raw material powder in air, wherein the primary particles constituting the granulated and sintered yttria particles have an average particle size between 0.5 and 1.5 µm inclusive, and 1.15 times or more as large as the raw material powder.

* * * * *